United States Patent [19]

Pemsler et al.

[11] 4,211,753
[45] Jul. 8, 1980

[54] RECOVERY OF MOLYBDENUM VALUES FROM DILUTE SOLUTIONS

[75] Inventors: J. Paul Pemsler, Lexington; John K. Litchfield, Bedford, both of Mass.

[73] Assignee: Kennecott Copper Corporation, New York, N.Y.

[21] Appl. No.: 962,158

[22] Filed: Nov. 20, 1978

[51] Int. Cl.² ............................................. C01G 39/00
[52] U.S. Cl. ........................................ 423/54; 423/55; 423/58; 423/61; 423/593; 423/166
[58] Field of Search ............... 423/54, 55, 58, 53, 423/56, 61; 75/101 BE

[56] References Cited

U.S. PATENT DOCUMENTS

| | | | |
|---|---|---|---|
| 2,079,805 | 5/1937 | Judd | 423/58 |
| 2,460,975 | 2/1949 | Carosella | 423/58 |
| 3,770,869 | 11/1973 | Kim et al. | 423/58 |
| 3,983,017 | 9/1976 | Szabo | 423/53 |
| 4,116,488 | 9/1978 | Hsueh et al. | |

*Primary Examiner*—Herbert T. Carter
*Attorney, Agent, or Firm*—John L. Sniado; Anthony M. Lorusso

[57] ABSTRACT

Molybdenum is recovered from dilute, ammoniacal, molybdenum containing solutions by adding ferrous ions to the solution to precipitate an iron hydroxide-ammonium molybdate complex. The precipitate is separated from the aqueous raffinate and is treated with acid to resolubilize the molybdenum in the complex. Molybdenum values are recovered from the resulting acid solution by ion exchange. The aqueous raffinate is purged of iron and is reused.

12 Claims, 3 Drawing Figures

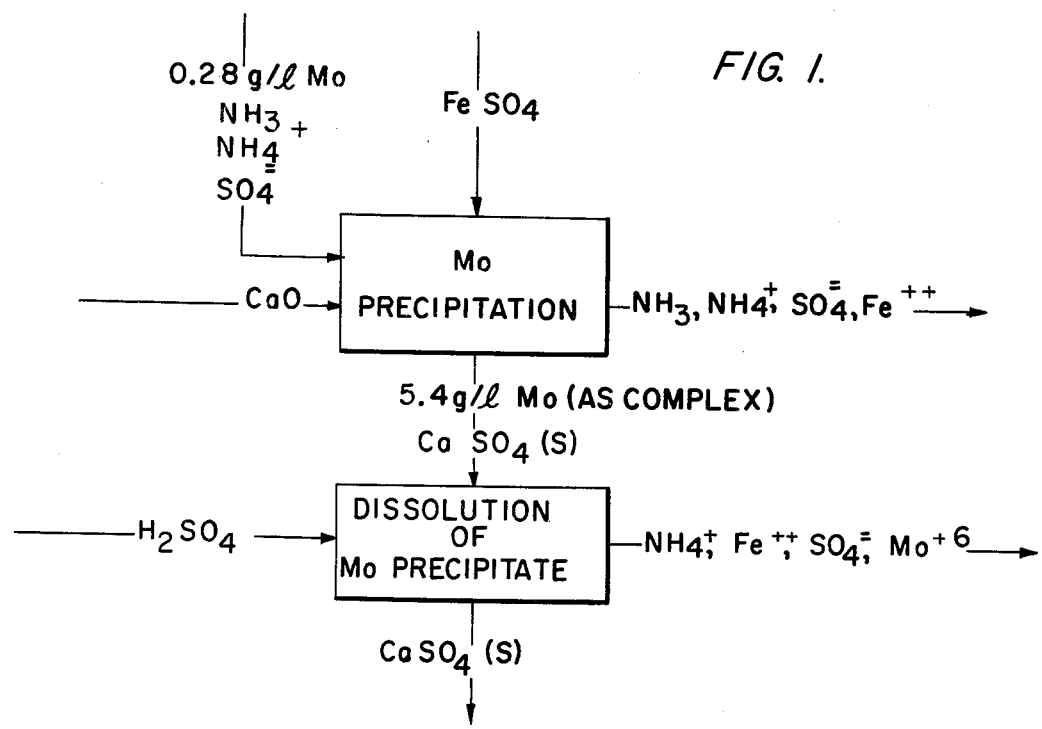

RECOVERY OF MOLYBDENUN VALUES FROM DILUTE SOLUTIONS

BACKGROUND OF THE INVENTION

The present invention relates to a process for recovering molybdenum from ammoniacal leach liquors. There are many hydrometallurgical processes in which low levels of molybdenum values remain in the raffinate after other metal values have been removed. One example of such a process is the "cuprion" process disclosed in U.S. Pat. No. 3,983,017 to Lester Szabo entitled "Recovery of Metal Values From Manganese Deep Sea Nodules Using Ammoniacal Cuprous Leach Solutions." The teachings of this patent are incorporated herein by reference.

In that process, manganese nodules are leached. The major metals of interest are copper and nickel; however, cobalt and molybdenum values are also solubilized in the ammoniacal leach liquor used. Indeed, in that process, the solubilized copper and nickel values are extracted from the leach liquor leaving molybdenum and cobalt in the raffinate. The present invention may be used to recover the molybdenum values from this type of raffinate.

Another source of molybdenum-containing ammoniacal leach liquors is from certain copper in-situ mining systems. An example of such an in-situ system is disclosed in U.S. patent application Ser. No. 724,548 entitled "In-Situ Mining Method and apparatus," the teachings of which are incorporated herein by reference.

The recovery of molybdenum from ammoniacal leach liquors obtained during in-situ mining and the cuprion process has met with severe economic constraints. These problems are due to the fact that it is difficult to extract molybdenum when present in low concentrations from an ammoniacal liquor. Although molybdenum may be selectively extracted from acidic solutions, the concentration of molybdenum present in these processes does not justify adding enough acid to convert the basic leach liquor into an acidic leach liquor. At this point, it is emphasized that economical recovery of molybdenum from acidic leach liquors is well known, and, in particular, amines can be utilized to extract molybdenum as a molybdate anion from acidic leach liquors. Once the molybdenum is loaded onto an amine, it can be stripped from the amine with ammonia.

Typical extractants for molybdenum include Alamine 336 which is a tertiary amine sold by General Mills and having the formula:

$R_3N$ where $R=C_8-C_{10}$

and Aliquot 336 which is a quarternary ammonium salt sold by General Mills having the formula $(R_3N^+CH_3)Cl^-$ where $R=C_8-C_{10}$(methyl tricaprylyl ammonium chloride).

SUMMARY OF THE INVENTION

The instant invention provides an economical method of concentrating and subsequently recovering the molybdenum values typically present in relatively small concentration in many ammoniacal leach liquors. The process is particularly well suited for recovering the molybdenum values leached while operating the "cuprion" process. Typically, such leach liquors contain molybdenum in concentrations on the order of 0.2 to 0.3 g/l. In practicing the invention, ferrous ions are added to the leach liquor to precipitate molybdenum. The precipitate is then treated with acid to redissolve the molybdenum and thus concentrate it.

Accordingly, it is an object of the invention to render hydrometallurgical mining techniques more economically feasible.

Another object of the invention is to provide a rapid and inexpensive method of concentrating and recovering the molybdenum values in ammoniacal leach liquors.

Another object of the invention is to provide an overall molybdenum recovery process well suited for use downstream of a system for recovering copper and other metals from ammoniacal leach liquors.

BRIEF DESCRIPTION OF THE DRAWING

FIG. 1 is a schematic diagram illustrating one important embodiment of the method of concentrating molybdenum values in ammoniacal leach liquors;

FIG. 2 is a schematic diagram illustrating the relationship of the molybdenum recovery process of the invention to a copper recovery system and an in-situ mine.

DESCRIPTION OF THE PREFERRED EMBODIMENT

Figure 3:
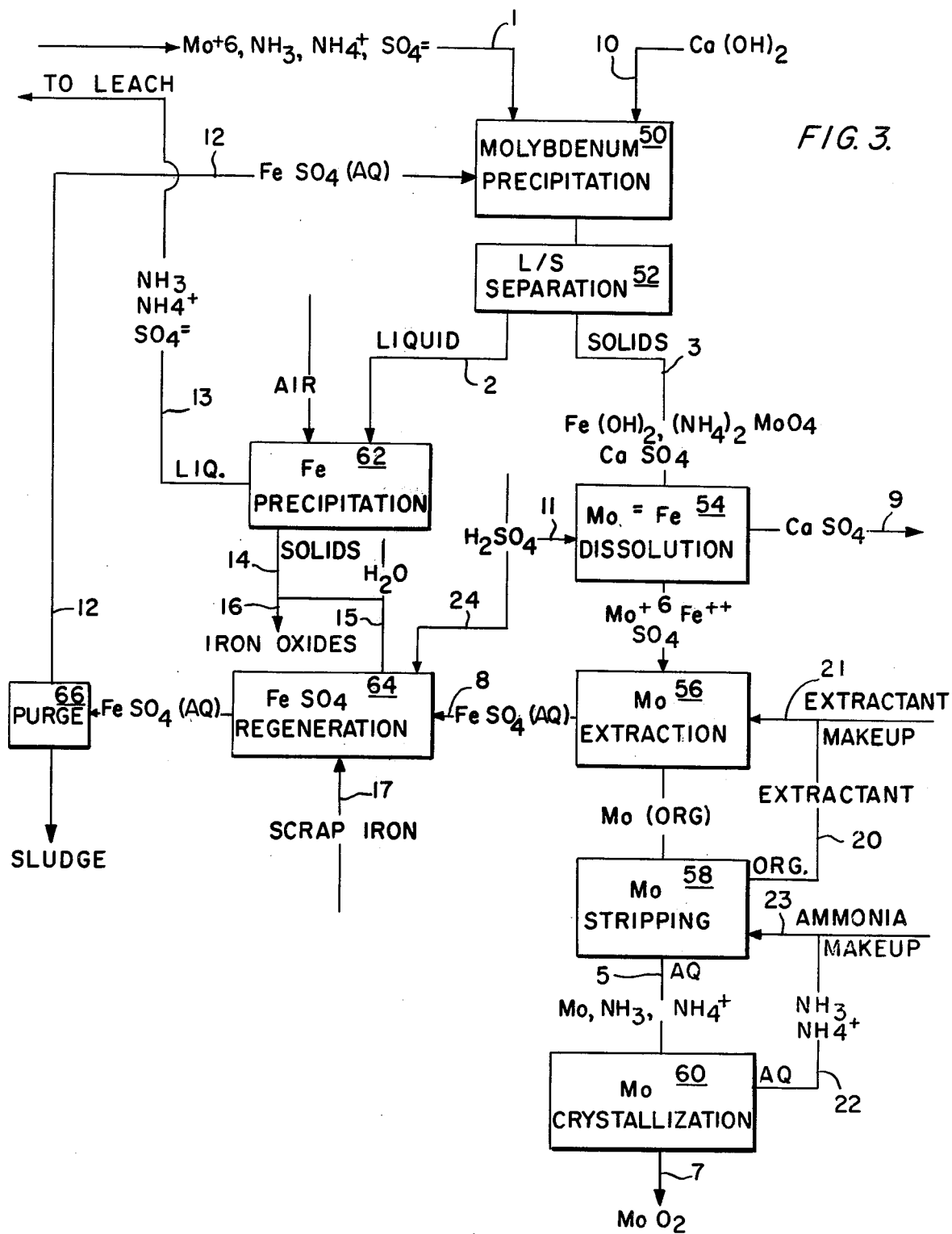
FIG. 3 is a schematic diagram illustrating one important embodiment of the overall molybdenum recovery process of the invention.

At the outset the invention is described in its broadest overall aspects with a more detailed description following. In its broadest overall aspects, the invention comprises a rapid and inexpensive method of concentrating the molybdenum values present in ammoniacal leach liquors by a factor of about 20, e.g., from about 0.28 g/l to about 5.4 g/l. After such upgrading of the molybdenum content of a metal bearing liquor, molybdenum recovery by ion exchange becomes economically feasible. In the concentration process, ferrous ions, preferably but not necessarily as ferrous sulfate, are added to the molybdenum containing leach liquor to precipitate the molybdenum values therein as a ferrous hydroxide ammonium molybdate complex. Sufficient $Fe^{++}$ ion is added to saturate the solution, and then excess $Fe^{++}$ is added to precipitate a solid complex whose approximate Fe/Mo ratio is 3.5. The solid complex produced is then separated from the aqueous liquor and treated with acid to resolubilize the molybdenum values.

In preferred embodiments, excess sulfate ion is removed from the leach liquor by treatment with lime. This latter step results in the formation of a calcium sulfate precipitate (gypsum) which is unaffected by the acidic dissolution of the molybdenum containing complex and thus may readily be separated from the concentrated aqueous molybdenum solution by filtration or the like.

The concentration technique for recovering molybdenum values set forth above preferably is employed on copper-free aqueous ammoniacal leach liquors. However, molybdenum can be precipitated from copper containing ammoniacal leach liquors with the present process. When the present invention is practiced on copper containing leach liquors, copper powder will precipitate before molybdenum precipitation begins. Thus, a method of separating the copper from the molybdenum is to stage the reactions. For a more detailed discussion of using ferrous ions to precipitate copper see U.S. patent application Ser. No. 962,159 entitled Recovery of Copper by Ferrous Ion Precipitation, filed on even date herewith, the teachings of which are incorporated herein by reference.

With regard to the presence of other ions, there is no interference by alkali metals (Na, K, etc.), alkaline earth metals (Ca, Mg, etc.) or Al. Nickel goes through the process unaffected. Cobalt behavior is complex and some cobalt can be removed if the cobalt concentration is high. In the dilute solution of the type produced in in situ mining or in the cuprion process cobalt precipitation is not a problem.

Furthermore, amines will only extract anions. Thus, even if some unwanted metals precipitate, they will not be extracted by an amine unless they complex as an anion. Of course, in the present process molybdenum complexes as a molybdate.

In the process of the present invention, ferrous ion is added to the leach liquor in sufficient quantities to first saturate the solution and then in excess to set the Fe/Mo weight ratio above 3.5, preferably about 4, so that a ferrous hydroxide-ammonium molybdate complex containing substantially all of the Mo values is produced. This complexing step should be performed in a non-oxidizing atmosphere. Thus, the step may be performed under an oil cover or in a nitrogen atmosphere. To increase the rate of the complexing reaction, the leach liquor may be heated to 30° C. or more; although, the reaction will proceed at lower temperatures, i.e., 20° C.

It is preferred to add the ferrous ion as ferrous sulfate; however, other ferrous reagents such as ferrous chloride, ferrous carbonate, or ferrous nitrate could be used. Although ferrous hydroxide added to the solution will remove small amounts of molybdenum, it is necessary that the ferrous ions be added either in solution or as a soluble compound. In other words, precipitation of the ferrous ions to form the ferrous hydroxidemolybdate complex must take place within the solution. The ferrous requirement is made up of two parts. First, ferrous ions will go into solution until the solubility limit is reached. The solubility of ferrous in ammonia/ammonium solutions is a complex function of both the ammonia concentration and the ammonium ion concentration. (Reference: D. J. Klocke and A. N. Hixson, Ind. Eng. Chem. Process Des. Develop., Vol. 11, No. 1, 1972, pp 141-6) Typically with in-situ leach liquors, the ferrous ion solubility is of the order of 0.2–2.0 g/l. After saturating the solution, it is necessary to add enough ferrous ion to achieve six moles of ferrous for each mole of molybdenum in solution. This is equivalent to a weight ratio of iron to molybdenum of about 3.5:1. Thus, the amount of ferrous ion to be added will depend both on the molybdenum content of the solution and the ammonia and ammonium contents. Therefore, different amounts of ferrous ion may be required for solutions with identical molybdenum concentrations. Lime may be added to the leach liquor to precipitate excess sulfate as gypsum, and the molybdenum containing precipitate together with the gypsum can be separated from the leach liquor as a mixed solid. The solid phase is then contacted with acid, e.g., sulfuric acid, to selectively resolubilize the molybdenum values. Thereafter, the gypsum is separated from the concentrated molybdenum containing solution and molybdenum is recovered by conventional techniques such as ion exchange.

The substantially molybdenum-free leach liquor which remains after separation of the mixed solids contains ferrous ions that must be removed prior to reuse. An example of a reuse would be reintroducing the liquor into an in-situ mine or back into the reduction-leach circuit of the "cuprion" process. Accordingly, the liquid phase is treated to precipitate the iron, preferably by air oxidation. To conserve ferrous sulfate, the resulting iron oxides are treated with sulfuric acid and scrap iron to regenerate FeSO$_4$. Also, after extraction of the molybdenum values from the concentrated molybdenum solution, the ferrous ions that remain in the raffinate are recycled.

FIG. 1 illustrates an embodiment of the method of concentrating dilute ammoniacal molybdenum containing leach liquors. There are many sources of molybdenum solutions that can be treated using the process of the invention; and, it will be appreciated that the process is useful in upgrading the molybdenum content of liquors having molybdenum concentrations both higher and lower than the 0.28 g/l molybdenum solution discussed herein. Typically, the aqueous raffinates from copper recovery systems for treating in situ leach liquors contain dissolved ammonia, ammonium ion, sulfate ion, and molybdenum values present on the order of 0.28 g/l as molybdate ion (MoO$_4^=$). On addition of ferrous sulfate to the leach liquor, a molybdenum containing precipitate forms which is believed to have the general formula:

$$[Fe(OH)_2]_X \cdot (NH_4)_2 MoO_4$$

At this point, it is emphasized that the exact formula or molecular arrangement of the molybdenum complex is not known. Experiments indicate that the precipitate has an Fe/Mo weight ratio of about 3.5. Thus, on the average, about 6 molecules of Fe(OH)$_2$ will be associated with each molecule of (NH$_4$)$_2$MoO$_4$ (X=6). Hydroxide ions will be present in solution due to the hydrolysis of ammonia; and, the addition of lime generates additional hydroxide. To assure that molybdenum precipitation is complete, an excess of ferrous sulfate is added to the leach liquor, e.g., a weight ratio of Fe/Mo greater than 4 is established after accounting for the Fe$^{++}$ required to saturate the solution. The untreated leach liquor usually contains sulfate ions; and with the addition of more sulfate as FeSO$_4$, the [SO$_4^=$] builds up to a point where it can interfere with downstream reactions. Accordingly, excess sulfate may be removed as gypsum. The liquid phase containing dissolved ammonium sulfate and iron may then be readily separated from the mixed precipitate by conventional liquid-solid separation techniques. Next, the molybdenum values (which are in the solids) are resolubilized by treatment with sulfuric acid. Since the acid treatment does not affect gypsum, the now concentrated molybdenum solution may be separated from the gypsum and treated as desired to recover the molybdenum values.

FIG. 2 illustrates the sequence of operations for treating in situ leach liquors to recover copper and molybdenum using the concentration technique of the invention. A leach liquor or lixivant containing ammonia, copper, molybdenum, ammonium, and sulfate ions is extracted from a production well and fed to a copper recovery system 100. The particular method employed for recovering copper forms no part of the instant invention. The de-copperized leach liquor is then fed to a precipitator 102 wherein the molybdenum values are precipitated by the addition of ferrous sulfate, and excess sulfate is converted to gypsum by the addition of lime. There is no intent to limit the present invention to a process in which lime is always added. Lime is added expediently to in situ liquors to maintain the proper hydroxide content and reject sulfate. By adding lime and ferrous ions together, separate mixing tanks are not required. However these reagents may be added sequentially. In this case, lime is added before the ferrous ions are added. The phases are then separated and the molybdenum containing solids delivered as a slurry to a molybdenum recovery system 104. The substantially molybdenum free aqueous leach liquor, now containing substantial quantities of ferrous ion as a consequence of the molybdenum precipitation, is delivered to reactor 106 where the ferrous values are removed prior to reintroducing the leach liquor into an injection well of an in situ mine.

In the embodiment shown in FIG. 2, the iron is removed by sparging air through the leach liquor, resulting in the production of iron oxides or hydroxides which may be separated by filtration or the like. Those skilled in the art will readily appreciate that there are various other suitable methods for reducing the iron concentration to a few parts per million to render the leach solution suitable for reintroduction into the in situ well. However, air oxidation is preferred because of its low cost.

Referring to FIG. 3, an important embodiment of the overall molybdenum recovery process of the invention is schematically illustrated. De-copperized leach liquor comprising a low concentration of molybdenum together with ammonia, ammonium ion, and sulfate ion enters a precipitation reactor 50 via stream 1. To precipitate excess sulfate and the molybdenum values contained in the leach liquor, an aqueous lime suspension and a ferrous sulfate solution are introduced into the reactor via lines 10 and 12, respectively. The molybdenum precipitation reaction mechanism is not adversely affected by the presence of gypsum. In fact, the hydrolysis of lime provides additional hydroxide ions which contribute to formation of the $Fe(OH)_2$ containing molybdenum complex.

After stirring to effect the reaction, the two-phase mixture is delivered to a conventional liquid-solid separator 52. The solid phase exits as a slurry via stream 3 and an aqueous stream containing ferrous, sulfate, and ammonium ions as well as ammonia exits via stream 2.

The molybdenum and iron containing complex and the gypsum are introduced together into dissolution tank 54. In tank 54, the molybdenum containing complex is selectively redissolved by sulfuric acid introduced at stream 11 to produce a concentrated molybdenum solution also containing ferrous, sulfate, and ammonium ions. The calcium sulfate is thereafter readily separated from the aqueous phase via stream 9, and the aqueous phase is delivered to a molybdenum extraction stage 56.

In the extraction stage, an organic extractant such as a tertiary amine is intimately contacted with the aqueous solution to effect molybdenum transfer from the aqueous to the organic phase. After separation of the phases, the aqueous phase containing dissolved ferrous sulfate is ejected via line 8 for ultimate reuse. The molybdenum containing organic phase, after being washed, is delivered to stripping stage 58 where molybdenum is stripped with an ammonia solution. After stripping, the molybdenum-free organic phase is recycled via line 20 to treat additional molybdenum values. The ammoniacal molybdenum solution is thereafter delivered via stream 5 to a molybdenum crystallization stage 60 for molybdenum recovery. In the molybdenum crystallization stage 60, the aqueous ammoniacal solution is removed such as by vacuum evaporation, and the molybdenum values are dried and roasted to produce $MoO_2$, which is collected via line 7. Ammonia may be recycled via line 22.

The liquid phase exiting liquid-solid separator 52 via stream 2 is purged of iron in iron precipitation reactor 62 by sparging air through the aqueous solution to precipitate iron oxides, and the substantially iron-free aqueous phase resulting is delivered via line 13 to an injection well of an in-situ mine. A portion of the iron oxides produced is mixed with water and introduced into ferrous sulfate regeneration reactor 64 via line 15. In the regeneration reactor, the iron oxides are reduced by treatment with sulfuric acid from stream 24 and scrap iron from stream 17. The resulting ferrous sulfate is mixed with the solution recovered from molybdenum extraction stage 56 via line 8, and is delivered to conventional purge system 66 wherein unwanted precipitates in the form of sludge are removed. Thereafter, the ferrous sulfate solution is delivered via stream 12 to molybdenum precipitation reactor 50 for reuse.

A material balance estimate has been prepared for the foregoing overall molybdenum recovery process. The materials present in each stream, expressed in grams per liter (where appropriate) and tons per hour, is set forth in table I below.

TABLE I

Material Balances for Mo Recovery from In-Situ Liquors

| Steam Components | | 1 | 2 | 3 | 5 | 7 | 8 | 9 | 10 | 11 | 12 |
|---|---|---|---|---|---|---|---|---|---|---|---|
| $NH_3$ | gpl | 23 | 21.9 | — | 19.6 | — | — | — | — | — | — |
|  | tph | 19.7 | 19.7 |  | 0.098 |  |  |  |  |  |  |
| $SO_4^{-2}$ | gpl | 24 | 22.8 | 70 |  |  | 70 |  |  | 70 | 86.1 |
|  | tph | 20.5 | 20.5 | 2.85 |  |  | 2.85 |  |  | 2.85 | 3.7 |
| $NH_4^{+1}$ | gpl | 9 | 8.6 | 2.11 | 17 |  | 2.16 |  |  |  | 2.05 |
|  | tph | 7.7 | 7.7 | 0.086 | 0.085 |  | 0.089 |  |  |  | 0.088 |
| $Fe^{+2}$ | gpl |  | 0.60 | 37 |  |  | 37 |  |  |  | 47.8 |
|  | tph |  | 0.54 | 1.51 |  |  | 1.51 |  |  |  | 2.05 |
| Mo | gpl | 0.28 | 0.027 | 5.4 | 43.2 |  | 0.098 |  |  |  | 0.093 |
|  | tph | 0.24 | 0.024 | 0.216 | 0.216 | 0.216 | 0.004 |  |  |  | 0.004 |
| $H_2SO_4$ | gpl |  |  |  |  |  | 1.72 |  |  | 71.4 | 3.5 |
|  | tph |  |  |  |  |  | 0.07 |  |  | 2.91 | 0.15 |
| Fe Solid | tph |  |  |  |  |  |  |  |  |  |  |
| Organic (10%) $R_3N$ where R = $C_8$—$C_{10}$ O/A=0.5 | tph |  |  |  |  |  |  |  |  |  |  |
| Solid Lime |  |  |  |  |  |  |  |  |  |  |  |

TABLE I-continued
Material Balances for Mo Recovery from In-Situ Liquors

| | | | | | | | | | | |
|---|---|---|---|---|---|---|---|---|---|---|
| Ca(OH)$_2$ | tph | | | | | | | 3.17 | | |
| Gypsum Solid CaSO$_4$ . 2H$_2$O | tph | | | | | | | 7.08 | | |
| Fe(III)* as Fe$_3$O$_4$ & Fe(OH)$_3$ | tph | | | | | | | | | |

| Stream Components | | 13 | 14 | 15 | 16 | 17 | 20 | 21 | 22 | 23 | 24 |
|---|---|---|---|---|---|---|---|---|---|---|---|
| NH$_3$ | gpl | 22.3 | — | — | — | — | 0.93 | — | 33.4 | 100% | |
| | tph | 19.7 | | | | | 0.02 | | 0.167 | 0.02 | — |
| SO$_4^{-2}$ | gpl | 23.3 | | | | | | | | | |
| | tph | 20.5 | | | | | | | | | 0.93 |
| NH$_4^{+1}$ | gpl | 8.8 | | | | | | | 3.2 | | |
| | tph | 7.7 | | | | | | | 0.016 | | |
| Fe$^{+2}$ | gpl | | | | | | | | | | |
| | tph | | | | | | | | | | |
| Mo | gpl | 0.027 | | | | | | | 8.3 | | |
| | tph | 0.024 | | | | | | | 0.041 | | |
| H$_2$SO$_4$ | gpl | | | | | | | | | | 50% |
| | | | | | | | | | | | 0.95 |
| Fe Solid | tph | | | | | 0.163 | | | | | |
| Organic (10%) R$_3$N where R = C$_8$-C$_{10}$ O/A=0.5 | tph | | | | | | | .0027 | | | |
| Solid Lime Ca(OH)$_2$ | tph | | | | | | | | | | |
| Gypsum Solid CaSO$_4$ . 2H$_2$O | tph | | | | | | | | | | |
| Fe (III)* as Fe$_3$O$_4$ & Fe(OH)$_3$ | tph | | 0.54 | 0.38 | 0.16 | | | | | | |

The foregoing material balances are for a de-copperized molybdenum leach liquor containing approximately 23 g/l free ammonia, 24 g/l sulfate and 0.28 g/l molybdenum.

As has been stated above, the present invention is also applicable to recovering molybdenum values from the raffinate in a cuprion process. For example, the raffinate from the extraction stage of FIG. 5 of U.S. Pat. No. 3,983,017 can be delivered directly to a system such as the one represented schemmatically in FIG. 3. A major difference is that this raffinate will not contain a significant amount of sulfate ion. However, since sulfate ion is added at stream 12, this will present no problem.

The invention will be further understood from the following nonlimiting examples.

EXAMPLE 1

A solution containing 1000 ppm Mo., 11 g/l NH$_3$, 37 g/l (NH$_4$)$_2$SO$_4$ was heated to 30° C. in an inert atmosphere. FeSO$_4$ was added equivalent to 4 g/l Fe$^{++}$. The solution was mixed for 30 minutes and allowed to settle. The raffinate was analyzed.

| | Available | Raffinate | Precipitated |
|---|---|---|---|
| Mo | .1g | .003g | 97% |
| Fe$^{++}$ | .4g | .039g | — |

EXAMPLE 2

A solution containing 300 ppm Mo., 23 g/l NH$_3$, 33 g/l (NH$_4$)$_2$SO$_4$ was heated to 50° C. in an inert atmosphere. FeSO$_4$ was added equivalent to 3 g/l Fe$^{++}$. The solution was mixed for 30 minutes and allowed to settle. The raffinate was analyzed.

| | Available | Raffinate | Precipitated |
|---|---|---|---|
| Mo | .03g | .002g | 93% |
| Fe$^{++}$ | .3g | .158g | — |

EXAMPLE 3

A solution containing 200 ppm Mo., 6 g/l NH$_3$, 33 g/l (NH$_4$)$_2$SO$_4$, 1 g/l NH$_4$Cl was heated to 60° C. FeSO$_4$ was added equivalent to 1.5 g/l Fe$^{++}$. The solution was mixed for 10 minutes and allowed to settle. The raffinate was analyzed.

| | Available | Raffinate | Precipitated |
|---|---|---|---|
| Mo | .02g | .001g | 95% |
| Fe$^{++}$ | .15g | .022g | — |

EXAMPLE 4

A solution containing 300 ppm Mo., 24 g/l NH$_3$, 29 g/l (NH$_4$)$_2$SO$_4$ was heated to 60° C. in an inert atmosphere. FeSO$_4$ was added equivalent to 1.5 g/l Fe$^{++}$. The solution was mixed for 20 minutes and allowed to settle. The raffinate was decanted and analyzed. The precipitate was then resolubilized in 0.5 H$_2$SO$_4$ and analyzed for Mo.

| | Available | Raffinate | Precipitated grams | % | Resolubilized grams | % |
|---|---|---|---|---|---|---|
| Mo | .03g | .0035g | .0265g | 89% | .025g | 96% |
| Fe$^{++}$ | .15g | .064g | — | — | — | — |

EXAMPLE 5

A 200 ml solution containing 600 ppm Mo. and 11 g/l $NH_3$, was mixed with ferrous sulphate equivalent to 2.9 g/l Fe for 30 minutes. The precipitate was allowed to settle and the raffinate was decanted. The precipitate was then resolubilized in a strong (4.7 molar) $H_2SO_4$ and water solution.

Results

93% of the Mo was removed from the initial solution. The residues were acid solubilized with 97% of the Mo and 91% of the ferrous recovered.

|        | Available | Raffinate       | Precipitated | Resolubilized grams | % |
|--------|-----------|-----------------|--------------|---------------------|-----|
| Mo     | .12g      | 37 ppm (.007g)  | 93.5%        | .101g               | 97% |
| $Fe^{++}$ | .64g   | 33 ppm (.006g)  | 99%          | .547g               | 91% |

EXAMPLE 6

A 220 ml solution containing 570 ppm Mo, 34 g/l $(NH_4)_2SO_4$ and 11 g/l $NH_3$ was mixed with $FeSO_4$ equivalent to 2.9 g/l for 45 minutes. The precipitate was settled and the raffinate decanted and analyzed. The precipitate was then redissolved in 40% HCl water mixture.

Results

95% of the Mo was removed from the initial solution. 100% of the Mo and 84% of the ferrous was recovered from the precipitate. The ferrous to be used for recycle.

|        | Available | Raffinate       | Precipitated | Resolubilized grams | %   |
|--------|-----------|-----------------|--------------|---------------------|------|
| Mo     | .130g     | 30 ppm (.006g)  | 95%          | .124g               | 100% |
| $Fe^{++}$ | .64g   | 557 ppm (.112g) | 83%          | .443g               | 84%  |

EXAMPLE 7

A solution containing 1000 ppm Mo, 38 g/l $(NH_4)_2SO_4$, 12 g/l $NH_3$ was mixed with $FeSO_4$ equivalent to 8 g/l Fe for 15 minutes at 60° C. The precipitate was allowed to settle and the raffinate decanted. The precipitate was rinsed with a 60 g/l NaOH solution recovering 78% of the Mo. The ferrous was then resolubilized with a solution containing 180 g/l $NH_3$ and 110 g/l $(NH_4)_2SO_4$.

|        | Available | Raffinate | Precipitate | Mo Resolubilized | $Fe^{++}$ Resolubilized |
|--------|-----------|-----------|-------------|------------------|-------------------------|
| Mo     | .2g       | .0065g    | .1928g      | .157g (78%)      | —                       |
| $Fe^{++}$ | 1.6g   | .07g      | 1.53g       | .004g (1%)       | 1.49g (99%)             |

Results

97% of the Mo was removed from solution, 78% of the Mo was recovered from the NaOH rinse and 99% of the ferrous was recovered from the $NH_3(NH_4)_2SO_4$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for concentrating the molybdenum values in an aqueous ammoniacal leach liquor, said process comprising the steps of:
    A. adding ferrous ions to the liquor in sufficient quantities to saturate the leach liquor and provide an excess sufficient to precipitate a solid complex whose approximate Fe/Mo ratio is 3.5 or greater and precipitating the molybdenum values therein as a ferrous hydroxide ammonium molybdate complex;
    B. separating the molybdenum containing precipitate from the aqueous liquor; and
    C. adding acid to the separated molybdenum containing precipitate to resolubilize the molybdenum values.

2. The process as set forth in claim 1 wherein the aqueous ammoniacal liquor is de-copperized leach liquor.

3. The process as set forth in claim 1 wherein the ferrous ions are added as $FeSO_4$.

4. The process as set forth in claim 1 comprising the further step of extracting the molybdenum values as molybdate ions from the concentrated solution resulting from step C with an anion extractant.

5. The process as set forth in claim 4 wherein molybdenum values in the concentrated solution are extracted as molybdates by an amine.

6. The process as set forth in claim 5 wherein molybdenum values are stripped from the from the amine with ammonia.

7. A process for recovering molybdenum values from a de-copperized aqueous ammoniacal sulfate leach liquor, said process comprising the steps of:
    A. adding lime to the leach liquor to precipitate excess sulfate as gypsum;
    B. adding $FeSO_4$ to the leach liquor in sufficient quantities to saturate the leach liquor and provide an excess sufficient to precipitate a solid complex whose approximate Fe/Mo ratio is 3.5 or greater and precipitating the molybdenum values therein as a ferrous hydroxide ammonium molybdate complex;
    C. separating a molybdenum containing precipitate together with the gypsum from the leach liquor to produce a solid phase and a liquid phase;
    D. precipitating iron values from the liquid phase to reconstitute the leach liquor;
    E. contacting the solid phase with acid to resolubilize the molybdenum values;
    F. separating the gypsum from the aqueous molybdenum containing solution produced in step E; and,
    G. extracting molybdenum values as molybdate ions from the aqueous molybdenum containing solution resulting from step F with an anion extractant.

8. The process as set forth in claim 7 wherein the iron is precipitated in step D by air oxidation.

9. The process as set forth in claim 7 wherein the molybdenum values are extracted as molybdates by an amine.

10. The process as set forth in claim 7 wherein a portion of the iron values precipitated in step D are treated with sulfuric acid and scrap iron to produce $FeSO_4$, and the $FeSO_4$ is used in step B to precipitate additional molybdenum values.

11. The process as set forth in claim 7 wherein $FeSO_4$ is present in a raffinate resulting from said extracting step, and the $FeSO_4$ is used in step B to precipitate additional molybdenum values.

12. The process as set forth in claim 7 wherein said leach liquor is an in-situ leach liquor and wherein the reconstituted leach liquor produced in step D is reinjected into an in situ mine.

* * * * *